May 17, 1960     W. O. WEEMS     2,936,547

ANIMAL CALL

Filed April 4, 1958

Wayne O. Weems
INVENTOR.

United States Patent Office 2,936,547
Patented May 17, 1960

2,936,547
ANIMAL CALL
Wayne O. Weems, Fort Worth, Tex.

Application April 4, 1958, Serial No. 726,563

3 Claims. (Cl. 46—180)

This invention relates to certain new and useful improvements in a call or calling device for animals, ducks, birds and the like through the medium of which a hunter or any other user, may successfully produce an audible sound to attract the desired prey.

Needless to say, the art to which the invention relates offers many and varied styles and forms of duck and wild animal calling devices. As a general rule the "voice" or sound producing and emitting device or means is characterized by an appropriately prepared reed which when set into vibration by the user provides a call in imitation of the particular bird or animal which is being hunted. In fact, the hunter of today can readily purchase on the open market so-called calls for cats, crows, hawks, foxes, turkeys, squirrels and so on. Ordinarily, and therefore as a general proposition the construction of a selected call offers a given voice, for example, one suitable for wild turkeys. It follows that each purchased call is a separate or distinct sound instrument.

The instant concept has to do with the provision of a two-part or sectional holder or tube having a centralized internal space or chamber for readily insertable and removable sound producing and emitting units. The idea is that by purchasing a single holder, which includes a suitable mouthpiece, the one holder, makes it possible to accommodatingly use a plurality of standardized interchangeable sound producing devices, giving the user a choice of usage and enabling him to economize not only in the saving of money and time but in a space needed to accommodatingly carry and transport the components needed.

Briefly summarized the invention in a preferred embodiment thereof may be interpreted or construed as embodying a readily insertable, removable, and replaceable cartridge-like wind responsive sound emitting unit, and a holder for said unit, said holder having a pocket-like chamber in which said unit is removably fitted and comprising alined sections with communicating bores alined cooperatively with said unit, adjacent ends of said sections abutting and being separably joined.

Novelty is predicated on the above adaptation and wherein the outer section comprises a sleeve-like body. The bore of this body constitutes a tone delivering passage for the particular sound waves which are to be conveyed therethrough and emitted therefrom. The other section is detachably connected with the sleeve or body section and it, in turn is constructed so that it includes a suitable and well formed mouthpiece. The bore of the second section serves, of course, to introduce the air and added sounds, if any, from the user's mouth.

Other features and advantages of the invention will become more readily apparent from the following description and the accompanying drawing.

In the drawing wherein like numerals are employed to designate like parts throughout the views.

Figure 1:
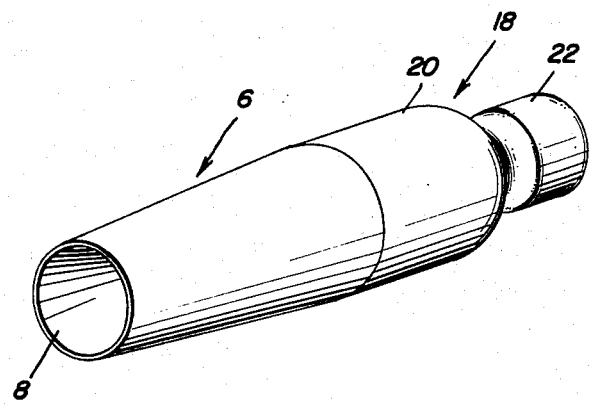
Fig. 1 is a perspective view of a multi-purpose call constructed in accordance with the principles of the invention.
Figure 2:
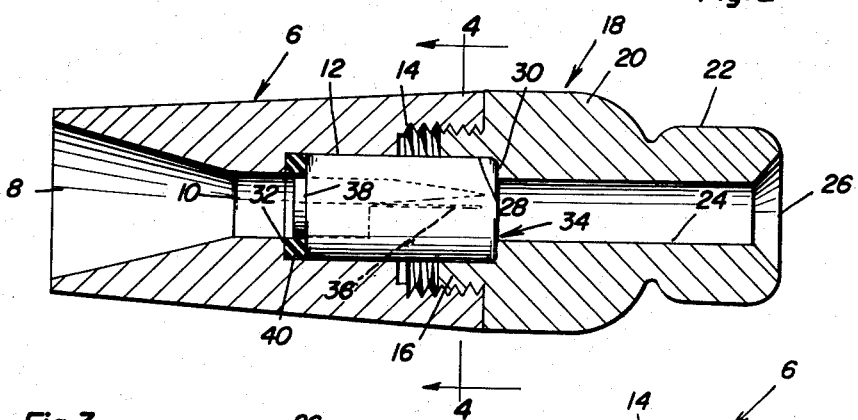
Fig. 2 is an enlarged view which is in effect a central longitudinal section based on Fig. 1 and with parts in elevation and showing an interchangeable standardized sound producing and emitting unit.
Figure 3:
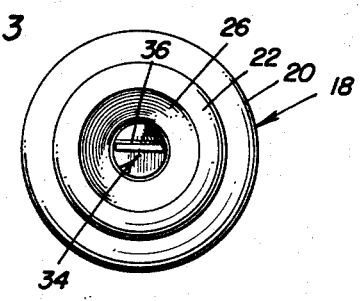
Fig. 3 is an end view observing the structure of Fig. 2 in a direction from right to left.
Figure 4:
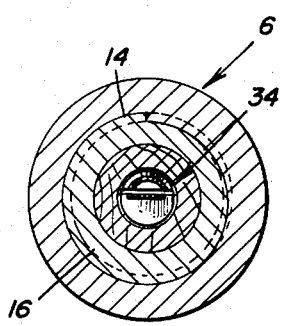
Fig. 4 is a cross-section on the line 4—4 of Fig. 2, looking in the direction of the arrows.

Referring now to the drawing and particularly to Fig. 2 the aforementioned outwardly disposed section is denoted by the numeral 6 and comprises a sleeve-like body. There is a central bore extending from end to end. The discharge or forward end of the bore is of tapered or conical form as at 8. The median portion 10 is of cylindrical reduced cross-section and adjacent thereto there is a counterbore or an enlarged recess 12 which defines a half-portion of the openable and closable chamber. The bore at the right hand end is further counterbored or otherwise enlarged and screw-threaded as at 14 to provide a socket. This socket serves to accommodate a suitably proportioned and screw-threaded neck 16 on the adjacent or abutting end of the companion mouthpiece section 18. The body portion 20 of this part is appropriately shaped to merge with the exterior of the sleeve 6. Then the right hand end portion is reduced externally shaped and reduced to provide a convenient and suitable mouthpiece 22. The bore of this section 18 is generally cylindrical and of the same cross-section throughout its major portion as at 24. The right hand end is beveled at 26 to provide a cup mouthpiece. The other end of the bore is counterbored or otherwise enlarged at 28 to provide the remainder of the aforementioned chamber. One end of this chamber constitutes a shoulder at 30 and the other end a similar shoulder at 32. These shoulders permit satisfactory engagement with the cooperating end portions of the insertable and removable as well as interchangeable voice device or as previously referred sound producing and emitting unit 34. This unit must conform with requisite nicety to the dimensions and shape of the chamber. It is intended to fill the chamber as shown. It is provided interiorly with a suitable reed 36 and holder therefor. At least one end is reduced as at 38 to accommodate an attachable and detachable rubber or equivalent packing ring 40. The ring abuts the shoulder 32. If two rings are used then both shoulders are contacted to provide a satisfactory air-tight joint between the cartridge-like unit 34 and end portions of the accommodation chamber.

Sound producing units or devices similar to the one shown are common and self-contained and are sometimes used in toys. However, the different "voices" will have to be made to serve the varying and intended purposes and needs of the hunter. In any event the chamber will be standardized and so will the unit 34 which fits therein, making it possible to interchange the devices from time to time. The call parts or sections may be made of plastic, wood, metal, fiber, fiber glass, rubber or other suitable materials. The "plug" or unit 34 may also be constructed of suitable material. The size of the overall device and chamber will vary to accommodate the type or kind of cartridge or plug unit employed therein.

Not only is the interchangeable feature of significance, the sectional construction is also important since it is necessary to dismantle and clean the instrument from time to time as is obvious. The mode of re-using this device is well-known to hunters and by experimentation and trial and error highly effective results are assured.

The foregoing is considered as illustrative only of the principles of the invention. Further, since numerous modifications and changes will readily occur to those skilled in the art, it is not desired to limit the invention to the exact construction and operation shown and

What is claimed as new is as follows:

1. For use when hunting; a multipurpose animal call comprising a sleeve having a longitudinal bore extending therethrough and opening through the distal and proximal ends, respectively, of the sleeve, the median portion of said bore being of restricted cross-sectional diameter, the portion therebeyond toward the distal end gradually increasing in cross-section and being conical and cooperating with the end portion of the sleeve in defining a bell-like horn, the portion of said bore between the median portion and proximal end being counterbored in a progressively stepped manner and a portion thereof being screw-threaded and providing a socket, another portion thereof being circular in cross-section and providing a half-portion of a chamber, a readily separable and connectible mounthpiece also having an axial bore extending through the ends thereof, the inner end of said bore being counterbored and registering with the complemental aligned counterbore and providing the other half-portion of said chamber, the forward end of said sleeve having a reduced assembling and connecting neck screwed into said screw-threaded socket, a readily insertable and removable sound unit confined in said chamber with its respective end portions abutting the corresponding end portions of the chamber, said sound unit having a bore passing therethrough registering with the bores in the sleeve and mouthpiece respectively and having air responsive sound-producing means in said bore, said unit corresponding in cross-section to the cross-section of the chamber and the distal end thereof being reduced in cross-section and surrounded by an applicable and removable packing ring.

2. A multipurpose call capable, when properly handled and used, of imitating many and varied voices comprising a holder embodying a sleeve section having an axial lengthwise bore opening through the ends thereof, said bore being gradually decreased in cross-section at the outer end and defining a generally conical horn, the inwardly disposed end portion of the bore being counterbored and screw-threaded to provide a socket, that portion between the socket and the tapering bore providing a half-portion of a chamber, and a complemental mouthpiece section having an axial bore extending therethrough and aligned with the first-named bore, having a reduced screw-threaded neck which is screwed into said socket and also having a counterbored portion providing the complemental half-portion of the aforementioned chamber, said chamber thus having shoulders at its respective inner and outer ends and being generally cylindrical in cross-section in order to accommodate a readily insertable and removable snug fitting air responsive sound-producing and emitting unit, said unit comprising a self-contained cartridge-like plug circular in cross-section from end to end, said unit being lodged effectually in said chamber with its respective ends abutting the respective shoulders at the ends of said chamber.

3. A multipurpose call capable, when properly handled and used, of imitating many and varied voices comprising a holder embodying a sleeve section having an axial lengthwise bore opening through the ends thereof, said bore being gradually decreased in cross-section at the outer end and defining a generally conical horn, the inwardly disposed end portion of the bore being counterbored and screw-threaded to provide a socket, that portion between the socket and the tapering bore providing a half-portion of a chamber, and a complemental mouthpiece section having an axial bore extending therethrough and aligned with the first named bore, having a reduced screw-threaded neck which is screwed into said socket and also having a counterbored portion providing the complemental half-portion of the aforementioned chamber, said chamber thus having shoulders at its respective inner and outer ends and being generally cylindrical in cross-section in order to accommodate a readily insertable and removable snug fitting air responsive sound-producing and emitting unit, said unit comprising a self-contained cartridge-like plug circular in cross-section from end to end, said unit being lodged effectually in said chamber with its respective ends abutting the respective shoulders at the ends of said chamber, said plug being provided at at least one end with a readily applicable and removable packing ring and having an outside diameter equal approximately to the inside diameter of the chamber and cooperating with the encompassing wall of the chamber to provide an airtight joint between the plug and cooperating shouldered ends of the chamber.

References Cited in the file of this patent

UNITED STATES PATENTS

| | | |
|---|---|---|
| 2,604,731 | Meucci | July 29, 1952 |
| 2,825,180 | Dieckmann | Mar. 4, 1958 |